United States Patent
Linke et al.

(10) Patent No.: US 9,925,713 B2
(45) Date of Patent: Mar. 27, 2018

(54) SYNCHRONOUS RUNNING SAFEGUARD FOR TRANSFER STATIONS FOR DEVICES FOR HANDLING CONTAINERS, AND A DEVICE AND A METHOD FOR BLOW-MOLDING CONTAINERS

(71) Applicant: KHS Corpoplast GmbH, Hamburg (DE)

(72) Inventors: Michael Linke, Hamburg (DE);
Michael Litzenberg, Geesthacht (DE);
Rolf Baumgarte, Ahrensburg (DE);
Frank Lewin, Tangstedt (DE)

(73) Assignee: KHS CORPOPLAST GMBH, Hamburg (DE)

( * ) Notice: Subject to any disclaimer, the term of this patent is extended or adjusted under 35 U.S.C. 154(b) by 253 days.

(21) Appl. No.: 14/914,172

(22) PCT Filed: Aug. 5, 2014

(86) PCT No.: PCT/EP2014/002143
§ 371 (c)(1),
(2) Date: Feb. 24, 2016

(87) PCT Pub. No.: WO2015/032463
PCT Pub. Date: Mar. 12, 2015

(65) Prior Publication Data
US 2016/0214306 A1    Jul. 28, 2016

(30) Foreign Application Priority Data

Sep. 4, 2013    (DE) .................. 10 2013 014 618

(51) Int. Cl.
*B29C 49/42*    (2006.01)
*B65G 47/84*    (2006.01)
(Continued)

(52) U.S. Cl.
CPC .......... *B29C 49/4205* (2013.01); *B29C 49/36* (2013.01); *B29C 49/421* (2013.01);
(Continued)

(58) Field of Classification Search
CPC . B65G 47/846; B29C 49/4205; B29C 49/421; B29C 2049/4221; B29C 49/4236; B29C 2949/78563
(Continued)

(56) References Cited

U.S. PATENT DOCUMENTS 3,370,547 A * 2/1968 Beyers .................. B61B 10/025
104/172.5
3,658,100 A * 4/1972 Fechheimer .............. B67C 3/24
141/152
(Continued)

FOREIGN PATENT DOCUMENTS

DE    2352926 A1    4/1975
DE    4212583 A1    10/1993
(Continued)

*Primary Examiner* — Robert B Davis
(74) *Attorney, Agent, or Firm* — Lucas & Mercanti, LLP; Klaus P. Stoffel

(57) ABSTRACT

A synchronous running safeguard for transfer stations or devices for handling containers, in particular for handling bottle-like containers made of glass or plastic, having a first and a second rotary element, which each have holding elements for the containers and each have a motor drive. The rotary elements are disposed in relation to one another such that the containers can be transferred in a transfer area from one of the first holding elements to one of the second holding elements. The rotary elements, each rotationally connected, have a control element having engagement elements, and the control elements are in meshing engagement with one another. The control elements are disposed in such a way that, during operation the control elements are interengaged without contact during the rotary movement of the rotary
(Continued)

elements and that, in the event of a fault, the control elements are interengaged with contact.

17 Claims, 11 Drawing Sheets

(51) Int. Cl.
    *B29C 49/36*     (2006.01)
    *B29C 49/64*     (2006.01)
    *B29C 49/78*     (2006.01)
    B29C 49/06     (2006.01)
    B29K 701/12     (2006.01)
    B29L 31/00     (2006.01)

(52) U.S. Cl.
    CPC ...... *B29C 49/4236* (2013.01); *B29C 49/6409* (2013.01); *B29C 49/78* (2013.01); *B65G 47/846* (2013.01); B29C 49/06 (2013.01); B29C 49/64 (2013.01); B29C 2949/78563 (2013.01); B29K 2701/12 (2013.01); B29L 2031/7158 (2013.01)

(58) Field of Classification Search
    USPC .......................................................... 198/576
    See application file for complete search history.

(56) References Cited

U.S. PATENT DOCUMENTS

| | | |
|---|---|---|
| 4,076,071 A | 2/1978 | Rosenkranz et al. |
| 5,346,386 A | 9/1994 | Albrecht et al. |
| 5,648,026 A | 7/1997 | Weiss |
| 2010/0159060 A1 | 6/2010 | Leblond et al. |
| 2011/0260372 A1 | 10/2011 | Hahn |

FOREIGN PATENT DOCUMENTS

| | | |
|---|---|---|
| DE | 4340291 A1 | 6/1995 |
| DE | 19906438 A1 | 8/2000 |
| DE | 10325693 A1 | 7/2004 |
| DE | 102008020116 A1 | 10/2009 |
| FR | 2252272 A1 | 6/1975 |

* cited by examiner

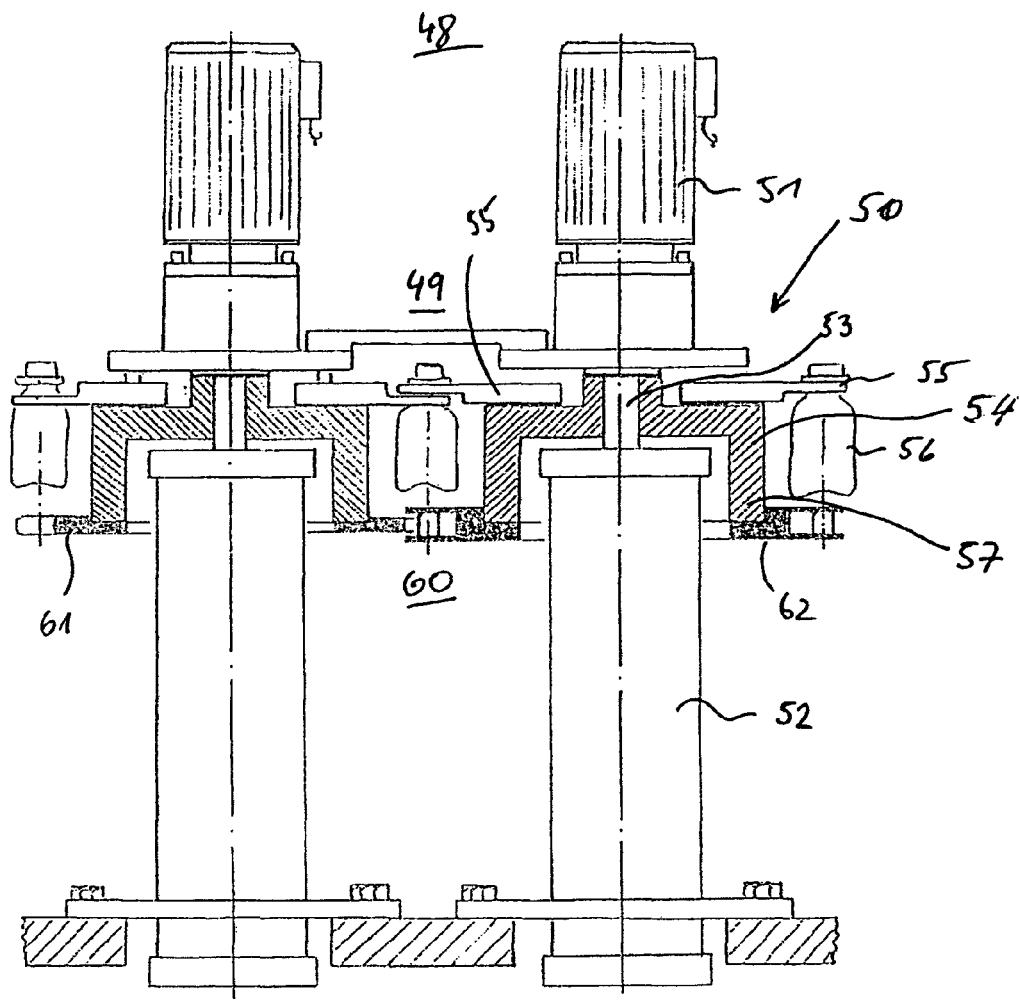
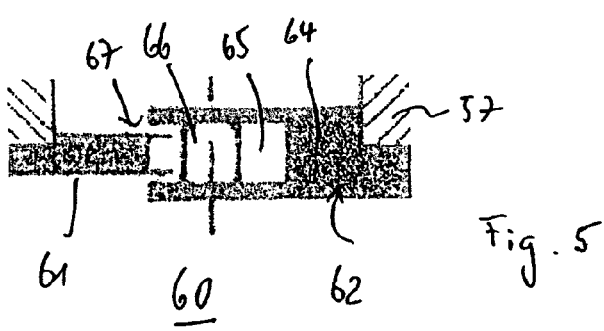
Fig. 4
Fig. 5

SYNCHRONOUS RUNNING SAFEGUARD FOR TRANSFER STATIONS FOR DEVICES FOR HANDLING CONTAINERS, AND A DEVICE AND A METHOD FOR BLOW-MOLDING CONTAINERS

The present application is a 371 of International application PCT/EP2014/002143, filed Aug. 5, 2014, which claims priority of DE 10 2013 014 618.6, filed Sep. 4, 2013, the priority of these applications is hereby claimed and these applications are incorporated herein by reference.

BACKGROUND OF THE INVENTION

The invention relates to a synchronous operation safeguard for transfer stations for devices for handling containers, in particular for handling bottle-like containers made of glass or plastic with a first and a second rotary element, each of which is provided with receiving elements for the containers and in each case comprises a motor drive, wherein the rotary elements are arranged relative to one another so that the containers in a transfer region can be transferred from one of the first receiving elements to one of the second receiving elements.

The invention, furthermore, relates to a device for blow-molding containers made of a thermoplastic material with at least two treatment stations with tools for receiving and holding preforms, for example a heating device for heating the preforms, and a blowing device for forming containers from preforms, which device is provided with blowing stations, with at least one transfer device for the transfer of the preforms from a treatment station to a further treatment station with tools, which are designed for removing the preforms from the treatment station, for the transport of the preforms to the further treatment station and for passing the preforms on to the further treatment station, wherein at least one of the treatment stations and/or the at least one transfer device comprise at least one mechanical control device for defining the movement of the tools, wherein the tools in their movement relative to one another have an engagement region and are arranged relative to one another so that the movement of the tools during normal operation takes place without contact, and wherein the drive of the movement of the tools of the treatment stations and/or of the transfer device takes place by means of individual drives, which are synchronized in terms of control and a method for securing tools for transporting preforms or containers, preferably mandrels or grippers, in such a device.

For packaging liquid foodstuffs and beverages, containers are used. These are in particular bottles made of glass or plastic or so-called pouches, but in this application, containers is to also mean preforms, closures or the like. The containers are produced in a production process in different devices and subsequently filled at a further device. During the production and filling process it is necessary to transport and transfer the containers between the individual process stages from one station to the other.

The production of containers made of plastic in a blowing device is mentioned as an example here. During a container molding through the effect of blowing pressure, preforms of a thermoplastic material, for example preforms made of PET (polyethylene terephthalate) are fed to different processing stations within a blowing machine. Typically, such a blowing machine comprises a heating device and a blowing device, in the region of which the previously temperature-controlled preform is expanded into a container by way of biaxial orientation.

The expansion is effected with the help of compressed air which is introduced into the preform to be expanded. The process sequence during such an expansion of the preform is explained in DE-OS 43 40 291. The introduction of the pressurized gas mentioned at the outset also comprises the pressure gas introduction into the developing container bubble and the pressure gas introduction into the preform at the start of the blowing process.

The fundamental construction of a blowing station for container molding is described in DE-OS 42 12 583. Possibilities for temperature controlling the preforms are explained in DE-OS 23 52 926.

Within the device for blow-molding, the preforms and the blown containers can be transported with the help of different handling devices. The use of transport mandrels onto which the preforms are plugged has proved itself in particular. However, the preforms can also be handled with other support devices. The use of grippers for handling preforms and the use of spreading mandrels, which for holding can be introduced into a mouth region of the preform, likewise are among the available designs.

Handling of containers using transfer wheels is likewise described in DE-OS 199 06 438 with an arrangement of the transfer wheel as transfer station between a blowing wheel and an output route.

Originally, the transport devices in such a processing machine, in particular ones that had to cooperate at high speed highly accurately, for example divisionally precisely or cooperate synchronously, were coupled to one another in a purely mechanical manner. For example, the inlet and outlet stars of a filler or a labeling machine were connected to one another rigidly, that is "divisionally correctly" by way of direct, non-slip drive connection, i.e. by way of gear wheels, toothed belts and toothed belt pulleys. With this solution, a fault, for example a power failure, merely resulted in a machine stoppage but not in a loss of the synchronous operation of the interconnected machine components.

For cost reasons, a rigid coupling is omitted, as a result of which expensive, assembly-intensive and hard-wearing transmissions, universal shafts etc. can be omitted. Instead, the individual components such as for example inlet star, outlet star, rotor of the treatment machine etc. are in each case provided with separate drive motors, the drive motors being for example servo-motors, which are preferentially equipped also with rotary position transducers. Rotary position transducers feed the actual angle of rotation back to the control. In the case of deviations between set and actual angle of rotation, a correction takes place automatically so that the motor reaches the set angle of rotation. This applies to "static" positioning tasks, in the case of which a motor is to reach a set angle of rotation and then remains without further rotary movement until a renewed change of the set angle of rotation occurs. Furthermore, this applies also to "dynamic" positioning tasks, in the case of which rotary movements are to proceed with one another simultaneously and synchronously to one another over several hours.

In the presence of a fault, the rotary element that deviates from the rotary synchronicity is switched so as to be without drive and so as to be freely rotatable. At the same time, the entire plant is brought to a halt. Through the presence of the residual energy that is inherent in the released rotary element, which is removed more slowly than that of the actively braked rotary element, "overtaking" by the released element and thus a collision can occur.

In order to avoid damaging the machines and production failures connected to this, either the synchronicity of the movements has to be ensured not only in the operating state but has to be absolutely maintained even during faults such as power failure, sudden load fluctuations etc. or damage has to be avoided in another way.

SUMMARY OF THE INVENTION

The object of the present invention is to improve a transfer station of the type mentioned at the outset in order to maintain the synchronicity during a fault by way of a suitable synchronous operation safeguard, and/or to improve a device and method for blow-molding containers of the type mentioned at the outset, in order to reduce the risk of damage in the event of a loss of the synchronicity during a fault.

According to the invention, the object, with respect to the synchronous operation safeguard, is solved in that the rotary elements in each case rotationally connected comprise a control element with engagement elements, in that the control elements are in meshing engagement with one another, wherein the control elements are arranged so that during operation during the rotary movement of the rotary elements they are in engagement without contact and in that they are in engagement with contact in the event of a fault.

Because of this, the advantage of the individual drive of the individual rotary elements is retained on the one hand and it is not necessary during operation to provide an energy-consuming connection between the elements. At the same time it is ensured in a simple manner that "overtaking" is excluded, so that a damaging collision is prevented.

An advantageous teaching of the invention provides that the engagement elements are teeth, pins, protrusions or depressions. It is advantageous, furthermore, that the control element is a gear wheel and/or a pin wheel. These elements are particularly suitable on the one hand for providing the contactless engagement option and at the same time ensure that driving in the case of a fault is ensured.

A further teaching of the invention provides that during operation between the engagement elements a gap is provided, wherein the gap is designed so that the receiving elements are without contact in the event of a fault. Because of this, the collision of the receiving elements is avoided in a simple manner.

A further teaching of the invention provides that the previously described synchronous operation safeguard is provided in a device for blow-molding described in the following. Because of this it becomes possible to secure certain sections of the device by way of a synchronous operation safeguard while other sections are decoupled from these synchronously-operating sections.

Furthermore, the object according to the invention with respect to the device for blow-molding is solved in that the tools of at least one of the treatment stations and/or of the transfer device can be moved out of the engagement region in the event of a fault through a movement of at least one section of the control device.

This brings about that a collision of the tools is avoided when a loss of synchronicity, for example of the drives, and thus of the tools, occurs.

An advantageous teaching of the invention provides that the mechanical control is a cam control. The same constitutes a preferred simple control possibility.

An advantageous teaching of the invention provides that the section of the cam control is embodied moveable corresponding to the engagement region, wherein the movement is preferably a vertical movement. It has transpired that this realization is particularly effective and cost-effective.

An advantageous teaching of the invention provides that movement of the control device takes place by way of a drive, preferably by way of hydraulic cylinders. An advantageous teaching of the invention provides that the tools are mandrels or grippers.

An advantageous teaching of the invention provides that multiple sections are provided, which in their movement are mechanically coupled to one another.

An advantageous teaching of the invention provides that the treatment stations are a heating device, a blowing device, a sterilization device, a cooling device, an additional heating device, cleaning device, labeling device and/or filling device.

A further advantageous teaching of the invention provides that the device for blow-molding comprises a synchronous operation safeguard described before. Because of this, an additional securing of the tools by ensuring the synchronization at least in sections of the device for blow-molding takes place.

The object according to the invention is solved with respect to the method in that the tools of at least one of the treatment stations and/or of the transfer device are moved out of the engagement region in the event of a fault through a movement of at least one section of the control device.

An advantageous teaching of the invention provides that the section of the cam control is moved correspondingly to the engagement region, wherein the movement is preferably a vertical movement.

In the drawing, exemplary embodiments of the invention are shown schematically. There:

BRIEF DESCRIPTION OF THE DRAWING

FIG. 4 shows a partly sectioned spatial representation of a synchronous operation safeguard according to the invention, FIG. 5 shows an enlarged detail representation regarding FIG. 4.

DETAILED DESCRIPTION OF THE INVENTION

Figure 1:
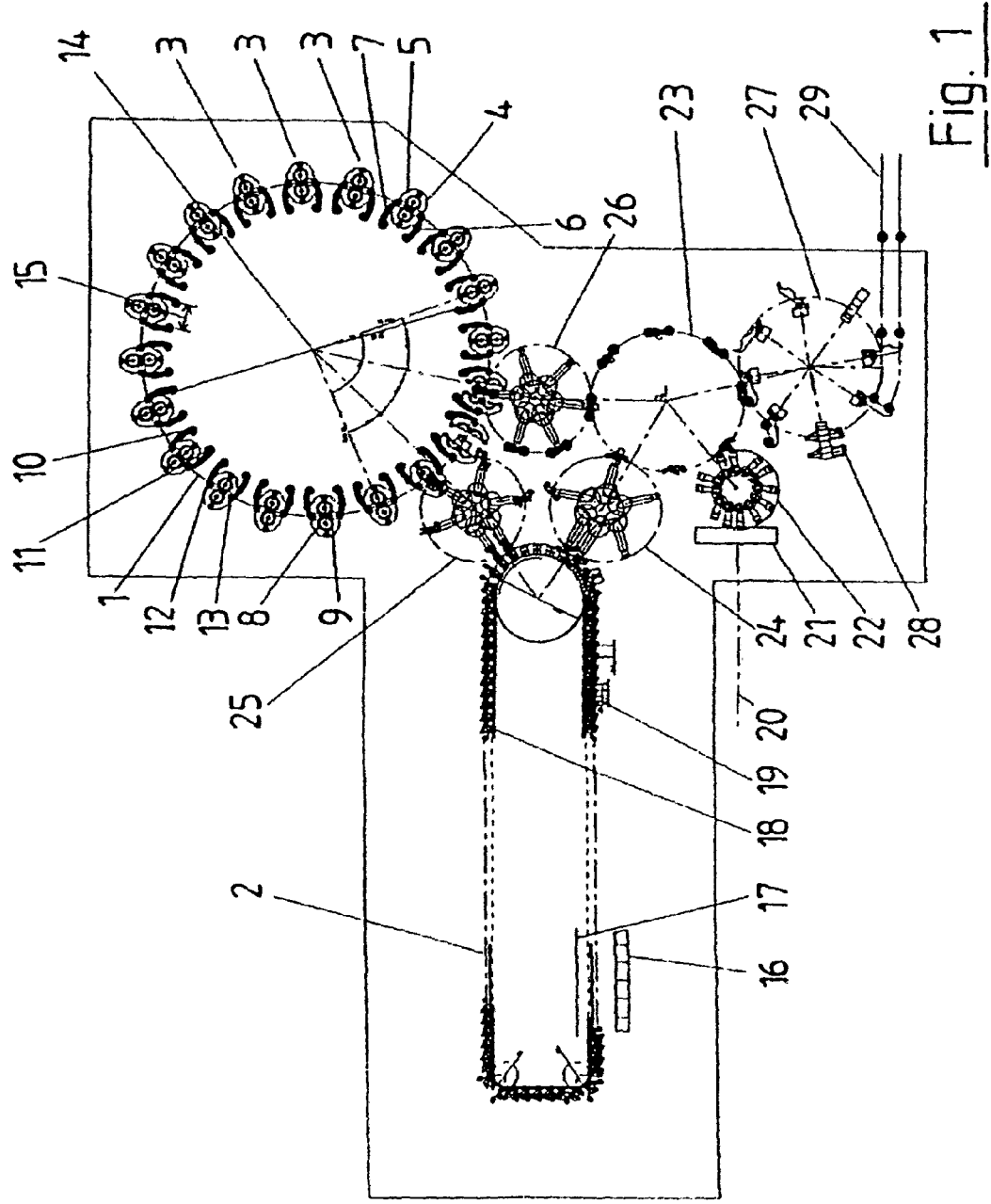
FIG. 1 shows an overview representation of a first device for blow-molding containers which comprises a heating device, a rotating blowing wheel provided with blowing stations and various transfer devices.

FIG. 1 shows the fundamental construction of a blowing machine, which is equipped with a rotating blowing wheel 1 and a heating device 2 for preforms to be temperature-controlled. Along a circumference of the blowing wheel 1, blowing stations 3 are arranged, which in each case comprise mold carriers 4, 5. The mold carriers 4, 5 are held by support arms 6, 7 and serve for positioning mold elements, typically mold halves 8, 9.

The support arms 6, 7 are rotation-moveably mounted relative to basic pivot bearings 10, 11. In addition to this, the support arms 6, 7 are rotation-moveably coupled to the mold carriers 4, 5 via pivot bearings 12, 13.

The blowing wheel 1 rotates relative to a blowing wheel axis 14 and the basic pivot bearings 10, 11 are arranged facing the blowing wheel axis 14 in radial direction. The basic pivot bearings 10, 11 have a bearing distance 15 relative to one another.

In the embodiment shown in FIG. 1, a heating device 2 is provided with a transport chain 18, which transports the preforms to be heated along heating elements 16. The heating elements 16 can for example be designed as IR-radiators. However it is likewise possible to provide radiators operating in other frequency ranges or a convection heating. In the shown embodiment, the heating elements 16 are arranged on one side along the transport route of the preforms and reflectors 17 are provided opposite the heating elements 16. In principle, an arrangement of heating elements 16 on both sides can also be realized. In the region of the transport chain 18, the preforms are held by support devices 19. These can for example be a holding of the preforms by way of grippers or spreading mandrels.

An input of the preforms can take place such that the preforms are initially fed to a turning device 21 along a transport rail 20, in the region of which the preforms are arranged with their mouths towards the top, which turning device 21 turns the preforms with their mouths downwards and passes them on to an input wheel 22. The input wheel 22 is coupled to the heating device 2 via transfer wheels 23, 24. In particular it is considered to place the preforms onto the support devices 19 even in the region of the transfer wheel 23 facing the input wheel 22.

The heating device 2 is coupled by means of a transfer wheel 25 to the blowing wheel 1 and containers that are finish-blown in the region of the blowing stations 3 are passed on by the blowing wheel 1 to a removing wheel 26. Via the transfer wheel 23, the removing wheel 26 is coupled to an output wheel 27, which transfers the blown containers 28 into the region of an output route 29. In the region of the output wheel 27, a practical change of the spatial orientation of the blown containers 28 can be carried out.

To make possible a high introduction of heat into the preforms without risk of overheating the outer surface it is possible to arrange blowers in the region of the heating device 2 in addition to the heating elements 16, which blowers conduct cooling air into the region of the preforms. It is possible, for example to alternately position heating elements 16 and blowers consecutively in transport direction of the preforms.

In order to be able to form a preform into a container 28 in such a manner that the container 28 has material characteristics that ensure a long usefulness of foodstuffs filled into the container 28, in particular of beverages, special method steps during the heating and orientation of the preforms have to be maintained. In addition to this, advantageous effects can be achieved by adhering to special dimensioning specifications.

As thermoplastic material, different plastics can be used. Suitable for use are for example PET, PEN or PP.

Expansion of the preform during the orientation process is effected through the supply of compressed air. The supply of compressed air is divided into a pre-blowing phase, in which gas, for example compressed air with a low pressure level is supplied and a following main blowing phase, in which gas with a higher pressure level is supplied. During the pre-blowing phase, compressed air with a pressure in the range from 10 bar to 25 bar is typically used and during the main blowing phase, compressed air with a pressure in the range from 25 bar to 40 bar is supplied.

Figure 2:
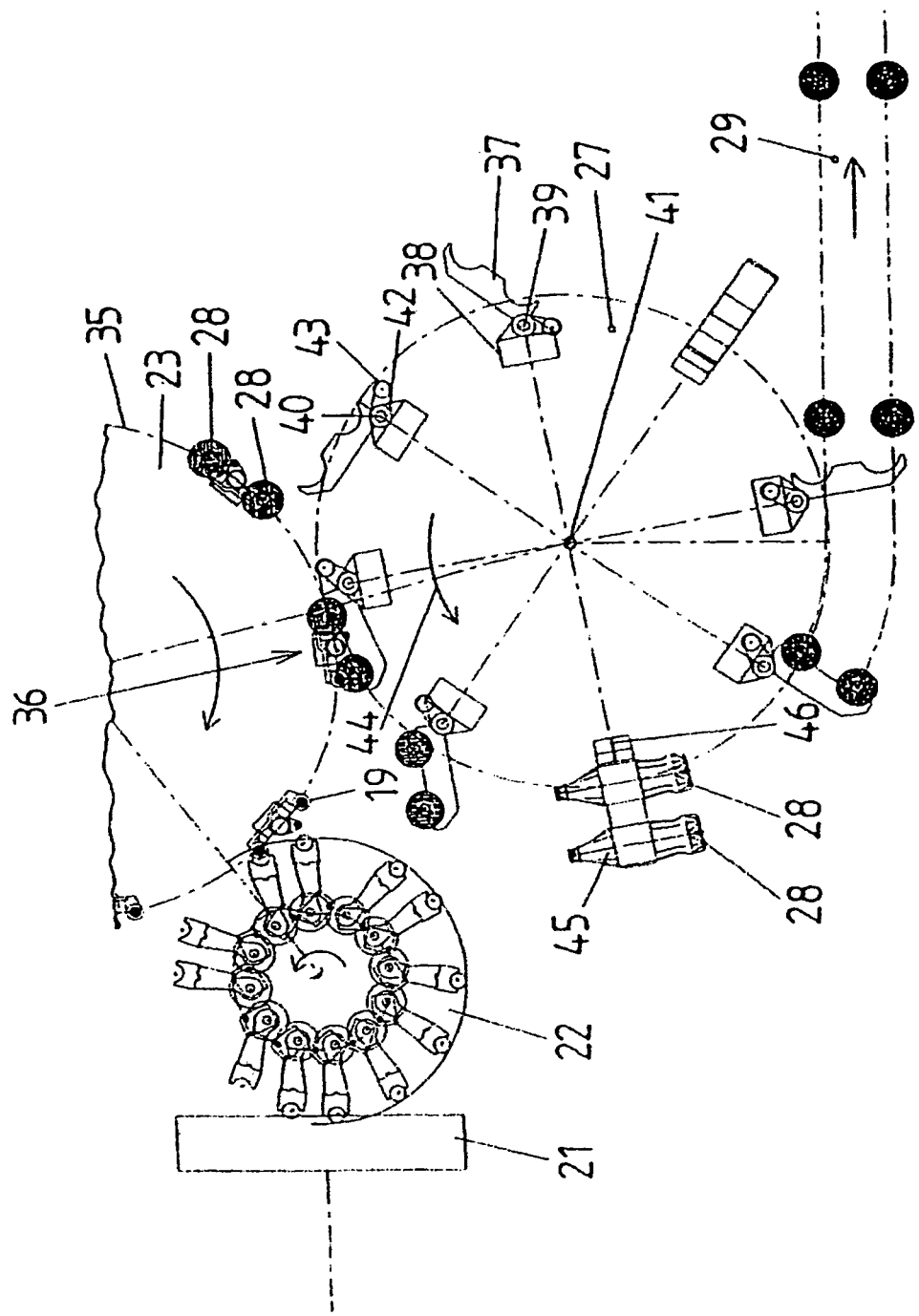
FIG. 2 shows an enlarged representation of the output wheel with assigned double-track output route.

FIG. 2 shows in an enlarged representation the output wheel 27 and the assigned regions of the transfer wheel 23 as well as of the output route 29. Also shown are the turning device 21 and the input wheel 22. Along a circumference 35 of the transfer wheel 23, two containers 28 are held in each case in movement direction one behind the other by a common support device 19. In a transfer region 36, the containers 28 are transferred from the support device 19 to holding elements 37 of the output wheel 27. Fixing the containers 28 in the region of the holding elements 37 can take place for example through the effect of vacuum.

In the region of the support device 19, the containers 28 can be attached for example. In the case of such a holding concept, a lifting of the containers 28 off the support devices 19 takes place in the transfer region 36. However it is likewise conceivable to hold the containers 28 in the region of the support devices 19 by grippers or other types of clamping elements.

In the region of the output wheel 27, bases 38 are provided for the holding elements 37, which bases 38 are connected via pivot joints 39 to the holding elements 37. Pivot axes 40 of the pivot joints 39 substantially extend parallel to an axis of rotation 41 of the output wheel 27.

In the region of their extensions facing the pivot joints 39 the holding elements 37 are provided with positioning levers 42 which carry cam rollers 43. The cam rollers 43 are guided in cam tracks which are not shown and define the respective pivot movements of the holding elements 37 relative to the basis 38.

Relative to a direction of rotation 44 of the output wheel 27, the holding elements 37 are arranged leading in movement direction relative to the bases 38. Immediately after a transfer of the containers 28 to the holding elements 37, the containers 28 are initially positioned in circumferential direction of the output wheel 27 one behind the other. Following the transfer, a pivot movement of the holding elements 37 relative to the axes of rotation 40 is defined by the positioning levers 42. The pivot movement is carried out until a connecting line of the containers 28 is oriented toward the axis of rotation 41 substantially in radial direction.

In addition to the already explained pivot movement of the holding elements 37, a further rotary movement of the holding elements 37 is carried out between the transfer region 36 and the output route 29. During this rotary movement, longitudinal axes 45 of the containers 28 are turned by 180°. For carrying out this rotary movement, the base 38 can be designed in multiple parts, wherein the base elements are connected to one another by a base axis of rotation 46, which substantially extends in radial direction relative to the axis of rotation 40 of the output wheel 27. Starting out from a spatial orientation in the region of the transfer wheel 23, the containers can thus be transferred with a mouth region downwards into a spatial orientation with a mouth region upwards.

Through the leading arrangement of the holding elements 37 relative to the bases 38 in movement direction in the transfer region 36, the time that is required for carrying out the position changes until the transfer to the output route 39 is extended on the one hand while it is additionally ensured that the containers 28 even after the rotary movement by 180° has been performed, are located in movement direction in front of the holding elements 37 upon a transfer to the output route 29.

In the explained exemplary embodiment, the holding elements 37 comprise receiving troughs 47 that have a rounded contour, in which troughs the containers 28 can be inserted. The receiving troughs 47 in this case run with their boundary surfaces along a part of the circumference of the containers 28. In the region of the receiving troughs 47, suction pockets can be arranged in order to hold the containers 28 through the effect of a vacuum.

Figure 3:
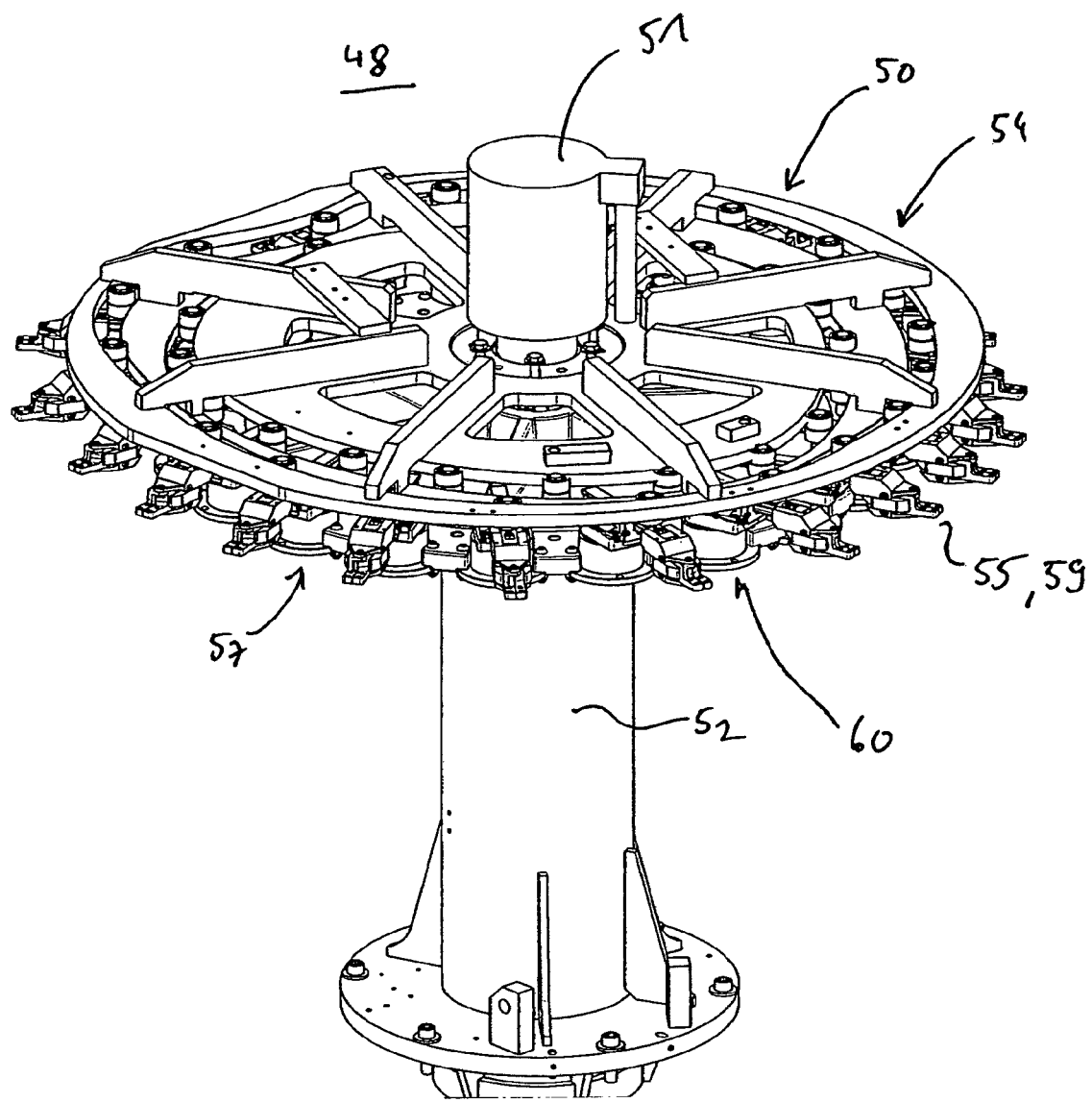
FIG. 3 shows a spatial representation of a rotary element according to the invention as transfer device.

FIG. 3 shows in spatial representation a transfer station 48 in an analogous or alternative embodiment to the transfer wheels 23, 24, 25 mentioned before with a servo-motor 51 arranged on the transfer station 48. The transfer station 48 in this case constitutes the first or second rotary element according to the invention. However, this can also be directly the blowing wheel or a deflection region of the heating route or the like analogous to FIGS. 1 and 2.

The transfer station 48 comprises a transfer wheel 50 which is seated on a bearing housing 52, in which the driveshaft 53 (see FIG. 4) is also mounted. The transfer wheel 50 comprises a carrier 54, on which the receiving elements 55 for the containers 56 are arranged. The transfer wheel 50 comprises a basic carrier 57, on which a control element 61, 62 as part of the synchronous operation safeguard 60 is arranged.

In FIG. 4, two transfer wheels 50 are shown, wherein the left transfer wheel is arranged with receiving elements 59 that are embodied so that in the transfer region 49, if necessary, they can grip the bottle 56 together with the receiving elements 55. The transfer wheels 50 in this case can be a removing or charging wheel, a blowing wheel, a transfer station or a section of a heating route or the like.

Figure 6:
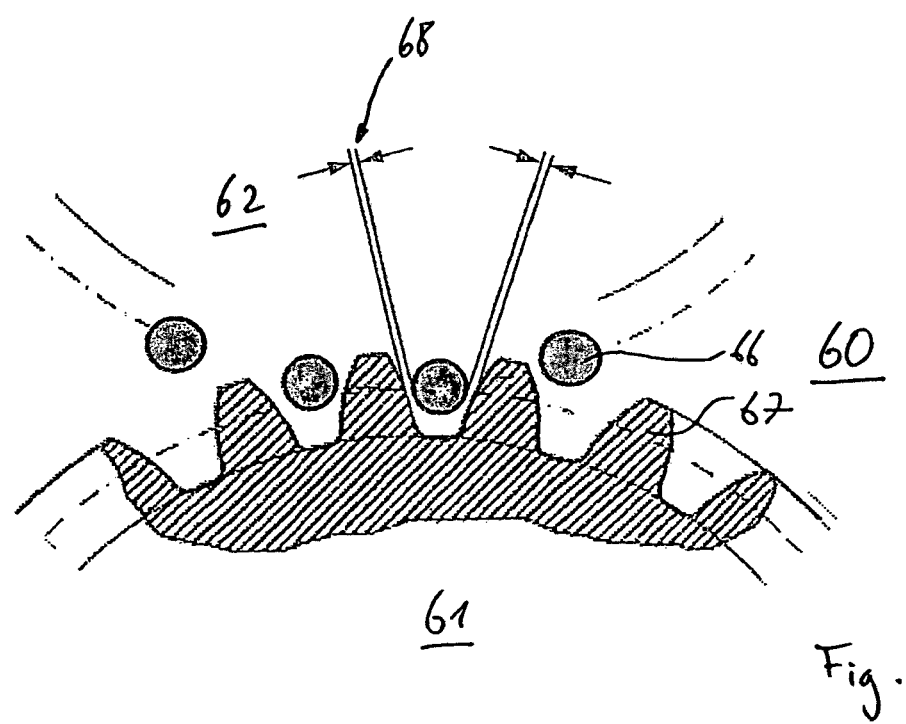
FIG. 6 shows a further detail representation in top view regarding FIG. 4 of the synchronous operation safeguard according to the invention in engagement.

The first control element 61 is a gear wheel. The second control element 62 is a pin wheel. These constitute the synchronous operation safeguard 60. A lateral sectional view in this regard is shown enlarged in FIG. 5. FIG. 6 shows a top view of the representation from FIG. 5.

The pin wheel 62 is composed of a basic carrier 64, which comprises recesses 65, in which pins 66 are arranged. The recesses 65 and the pins 66 in this case are designed so that these can be brought into engagement with the teeth 67 of the gear wheel 61 (see FIG. 6). The pins 66 and the teeth 67 in this case constitute the engagement elements according to the invention.

With a synchronous operation of pin wheel 62 and gear wheel 61 there is always an air gap 68 at the narrowest point between pins 66 and the teeth 67. Excessive slip in synchronous operation of the control elements 61, 62 and thus of the transfer wheels 50 in this case is mechanically limited or secured in this case by the positive connection, when the pin 66 comes into contact with a flank of the tooth 67. Because of this, an excessive offset of the transfer wheels 50 relative to one another is prevented, which offset can result in damage to the receiving elements 55, 59 (grippers etc.).

Figure 7:
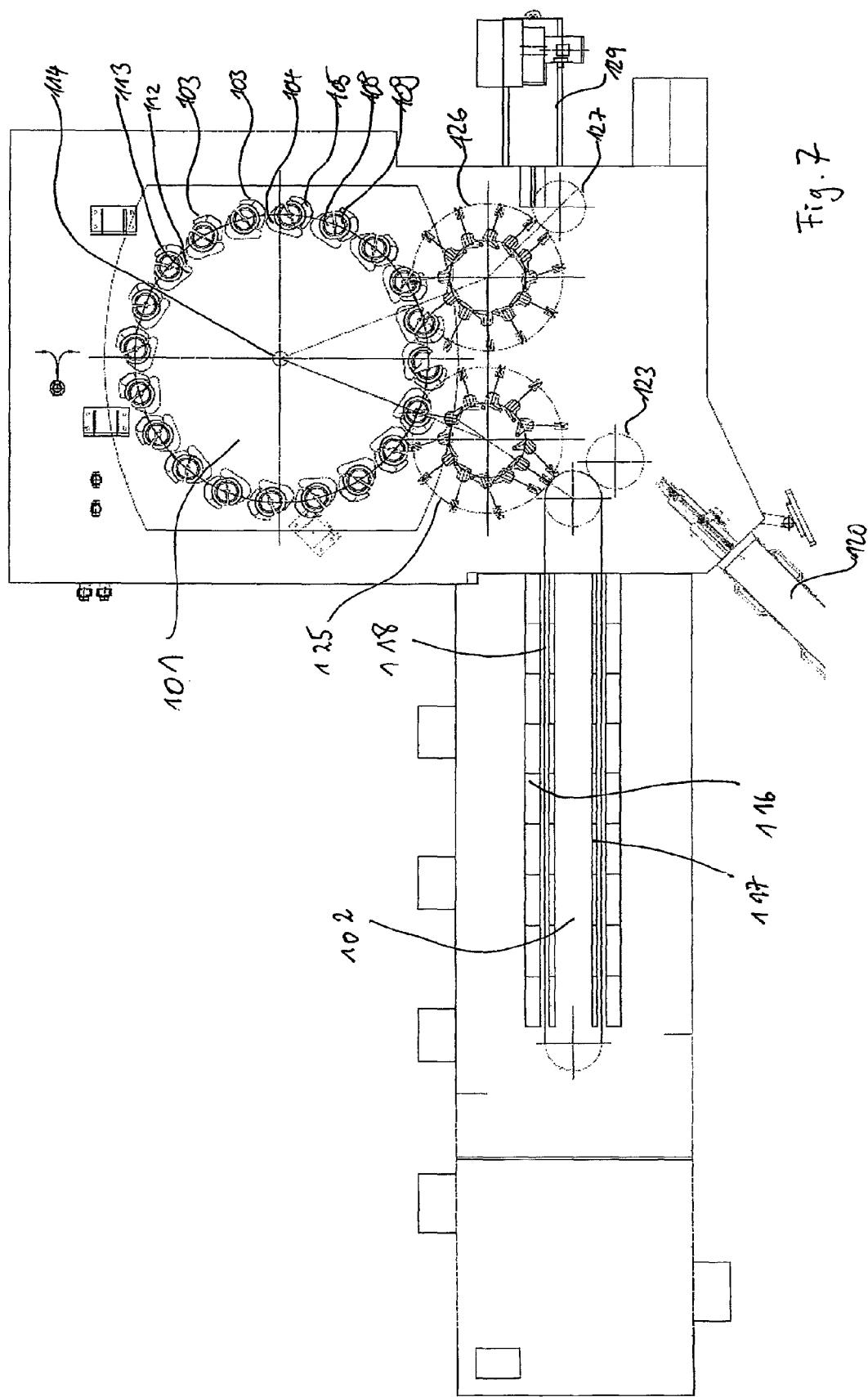
FIG. 7 shows an overview representation of an alternative device for blow-molding containers, comprising a heating device, a rotating blowing wheel provided with blowing stations and various transfer devices.

FIG. 7 shows the fundamental construction of an alternative blowing machine, which is equipped with a rotating blowing wheel 101 and a heating device 102 for preforms to be temperature controlled. Along a circumference of the blowing wheel 101, blowing stations 103 are arranged, each of which comprise mold carriers 104, 105. The mold carriers 104, 105 serve for positioning mold elements, typically mold halves 108, 109. The mold carriers 104, 105 are rotation-moveably coupled to the mold carriers 104, 105 via pivot bearings 112, 113. The blowing wheel 101 rotates relative to a blowing wheel axis 114.

In the embodiment shown in FIG. 7, the heating device 102 is provided with a transport chain 118, which transports the preforms to be heated along heating elements 116. The heating elements 116 can be designed for example as IR radiators. However, it is likewise possible to provide radiators operating in other frequency ranges or a convection heating. In the shown embodiment, the heating elements 116 are arranged on one side along the transport route of the preforms and located opposite the heating elements 116, reflectors 117 are provided. In principle, an arrangement of heating elements 16 on both sides can also be realized. In the region of the transport chain 118, the preforms are held by support devices or tools (not shown in FIG. 7). These can for example be holding the preforms via grippers or spreading mandrels.

The preforms can be input via a feeding device 120. The feeding device 120 is coupled to the heating device 102 by a transfer wheel 123.

The heating device 102 is coupled by means of a transfer wheel 125 to the blowing wheel 101 and containers that are finish-blown in the region of the blowing stations 103 are passed on from the blowing wheel 101 to a removing wheel 126. The removing wheel 126 is coupled to an output wheel 127, which transfers the blown containers into the region of an output route 129. In the region of the output wheel 127 a change of the spatial orientation of the blown containers can be carried out if necessary.

To make possible a high heat introduction into the preforms without the risk of overheating the outer surface it is possible to arrange blowers in addition to the heating elements 116 in the region of the heating device 102, which blowers direct cooling air into the region of the preforms. It is possible, for example, to alternately position heating elements 116 and blowers one after the other in transport direction of the preforms.

In order to be able to form a preform into a container in such a manner that the container has material characteristics which ensure a long usefulness of foodstuffs filled into the container, in particular of beverages, special method steps have to be adhered to during the heating and orientation of the preforms. In addition to this, advantageous effects can be achieved by adhering to special dimensioning specifications.

As thermoplastic material, different plastics can be used. Capable of being used are for example PET, PEN or PP.

The expansion of the preforms during the orientation process takes place through the supply of compressed air. The compressed air supply is divided into a pre-blowing phase, in which the gas, for example compressed air, is supplied with a low pressure level and a following main blowing phase, in which the gas is supplied with a higher pressure level. During the pre-blowing phase, compressed air with a pressure in the range from 10 bar to 25 bar is typically used and during the main blowing phase, compressed air with a pressure in the range from 25 bar to 40 bar is supplied.

Figure 8:
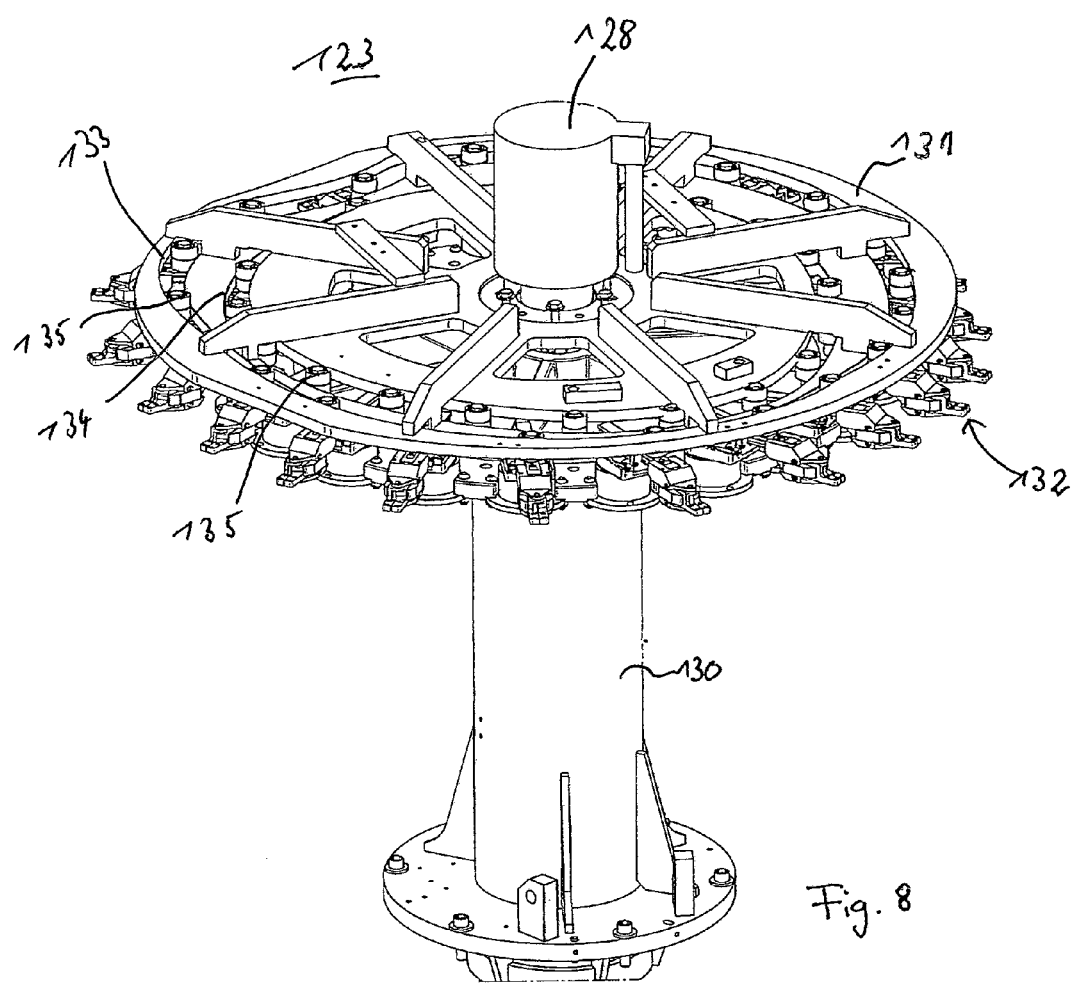
FIG. 8 shows a spatial representation of an alternative transfer device with mounted tools.

FIG. 8 shows in spatial representation a transfer wheel in analogous or alternative embodiment with respect to the previously mentioned transfer wheels 123, 125, 126 with a servo-motor 128 arranged on the transfer wheel.

The transfer wheel 125 is seated on a bearing housing 130, in which the driveshaft (not shown) is also mounted. The transfer wheel 125 comprises a carrier 131, on which the receiving elements in the form of grippers 132 for the containers/preforms are arranged. The transfer wheel 125 comprises a first and a second control cam 133, 134, via which the movement of the grippers 132 are controlled with rollers 135 that are arranged in connection with the control cams. The grippers 132 in this case are either pivoted or moved forward and backwards in order to make available the division that is necessary at a transfer point during the transfer.

Figure 9:
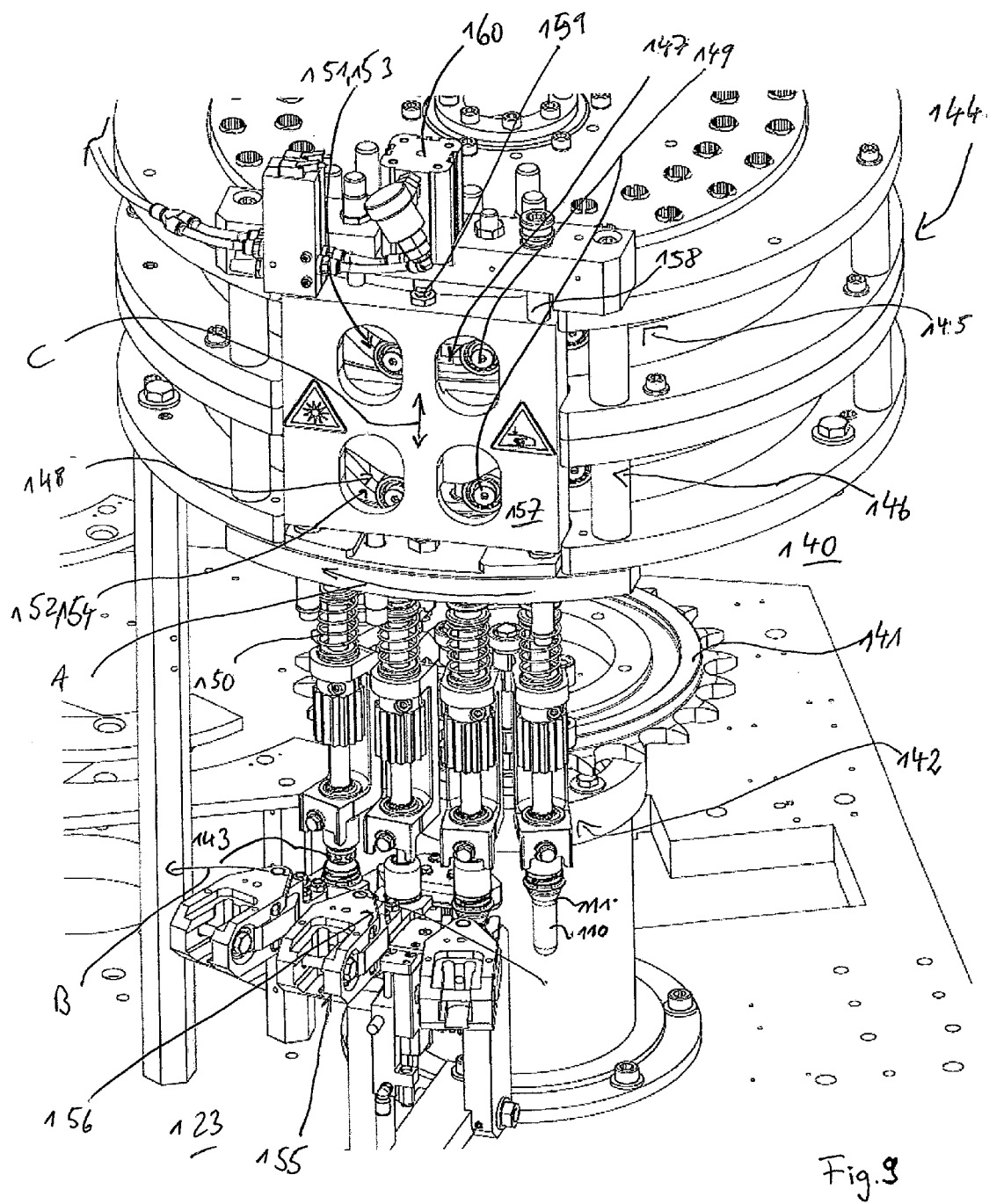
FIG. 9 shows a spatial representation of a transfer section of a heating device in engagement with a transfer device indicated by its tools, the tools of which are in engagement with the tools of the heating device.

FIG. 9 shows a transfer section 140 of a heating device 102. The same comprises a guide wheel 141, which assumes the cam guidance of the support devices/tools 142 in the form of mandrels 142. On the mandrels 142, preforms 110 are arranged held on their inside by a clamping mechanism 143 (see also FIG. 10). The transfer section 140 comprises a control wheel 144, on which a first cam control 145 and a second cam control 146 are arranged. The first cam control 145 comprises a cam 147, and the second cam control 146 comprises a cam 148. Within the cams 147, 148, control rollers 149 are arranged, via which are mechanically coupled to the mandrel 142, so that the vertical movement of the mandrels 142 and the opening and closing of the clamping mechanism 143 is controlled. For this purpose, the mandrel 142 is mounted vertically moveably against a spring 150. The roller 149 located in the first cam 147 is connected to a fork (not shown), which engages in the mandrel 142 and additionally shifts the mandrel 142 vertically depending on the position of the cam 147. The roller 149 that is located in the second cam 148 is connected to the clamping mechanism 143. When the roller is vertically lowered, the clamping mechanism 143 opens and releases the clamped preform 110.

During the transport of the mandrels through the heating device 102 in the heating region, the cams 147, 148 have a constant horizontal shape, so that the vertical position of the mandrels 142 does not change and the preforms 110 are locked in the clamping mechanisms 143. In the transfer section 140, the cams 147, 148 have a section 151, 152 in which the cams 147, 148 are embodied as arcs 153, 154, which faces downwards, so that the rollers 149 located in the cams 147, 148 are subjected to a position change downwards, as a result of which the mandrels 142 are vertically moved in accordance with the shape of the arc 153, and the clamping mechanism 143 is opened in accordance with the arc 154.

By moving the preforms 110 downwards, these are brought into the correct position for the engagement in the correspondingly provided region with the tools 155 of the transfer wheel 123. The tools 155 are grippers 155. These are shown in FIGS. 9 to 12 in place of the transfer wheel 123. The grippers 55 during the receiving of the preforms 110 grip the preform 110 for example below a prefabricated mouth region 111 of the preform 110 from the outside. The grippers 155 rotate in the process in movement direction B, wherein they are pivoted on the transfer wheel 123 so that in the engagement region 156 between mandrels 142 and grippers 155 they are additionally pivoted so that they correspond with the arrangement of the mandrels. As is visible in FIG. 6, the right one of the three shown grippers 155 comprises the preform 110 locked on the mandrel 142 below its mouth region 111 in the opened state. Following this, the mandrel 142 is lowered with the preform 110 (middle gripper 155), after which the gripper 155 is closed about the preform 110, so that said gripper grips the preform 110, the clamping mechanism 143 is released and the mandrel 142 is raised (left gripper 155). The preform 110 is thus removed from the heating device 102 and transferred to the transfer wheel 123. The movement of the mandrels and of the grippers in this case is synchronized, so that the two tools 142, 155 are located in the engagement region 156 but do not touch one another for as long as there is synchronization.

If this synchronization is lost, for example through a drive fault or the like, the tools 142, 155 would touch and damage would occur. In order to avoid this, the invention provides that the cam sections 151, 152, which bring about a lowering movement of the mandrels 142 into the engagement region and the opening of the clamping mechanism 143 and thus the release of the preform 110, are moveably mounted so that it is possible to move the cam sections 150, 151 out of their operating position so that the mandrels 142 no longer get into the engagement region 156 and thus no contact with the grippers 155 can develop and consequently no damage to the tools 142, 156 can occur.

Alternatively or additionally, relevant sections (not shown) of the cams 133, 134 on the transfer wheel 123, which sections bring the grippers 155 into the movement region 156, can be moveably designed so that it is possible to move the cam sections out of their operating position so that the grippers 155 no longer get into the engagement region 156 and thus no contact and consequently no damage of the tools 142, 155 can occur. This is not shown in the figures, the person skilled in the art can according to the following suitably carry out the alternative embodiment or an adaptation of the invention to the transfer of the preforms to the blowing stations 103 of the blowing wheel 101 or the transfer of the containers from the blowing stations 103 of the blowing wheel 101 to the output wheel 127 within the scope of his expert activity.

Figure 10:
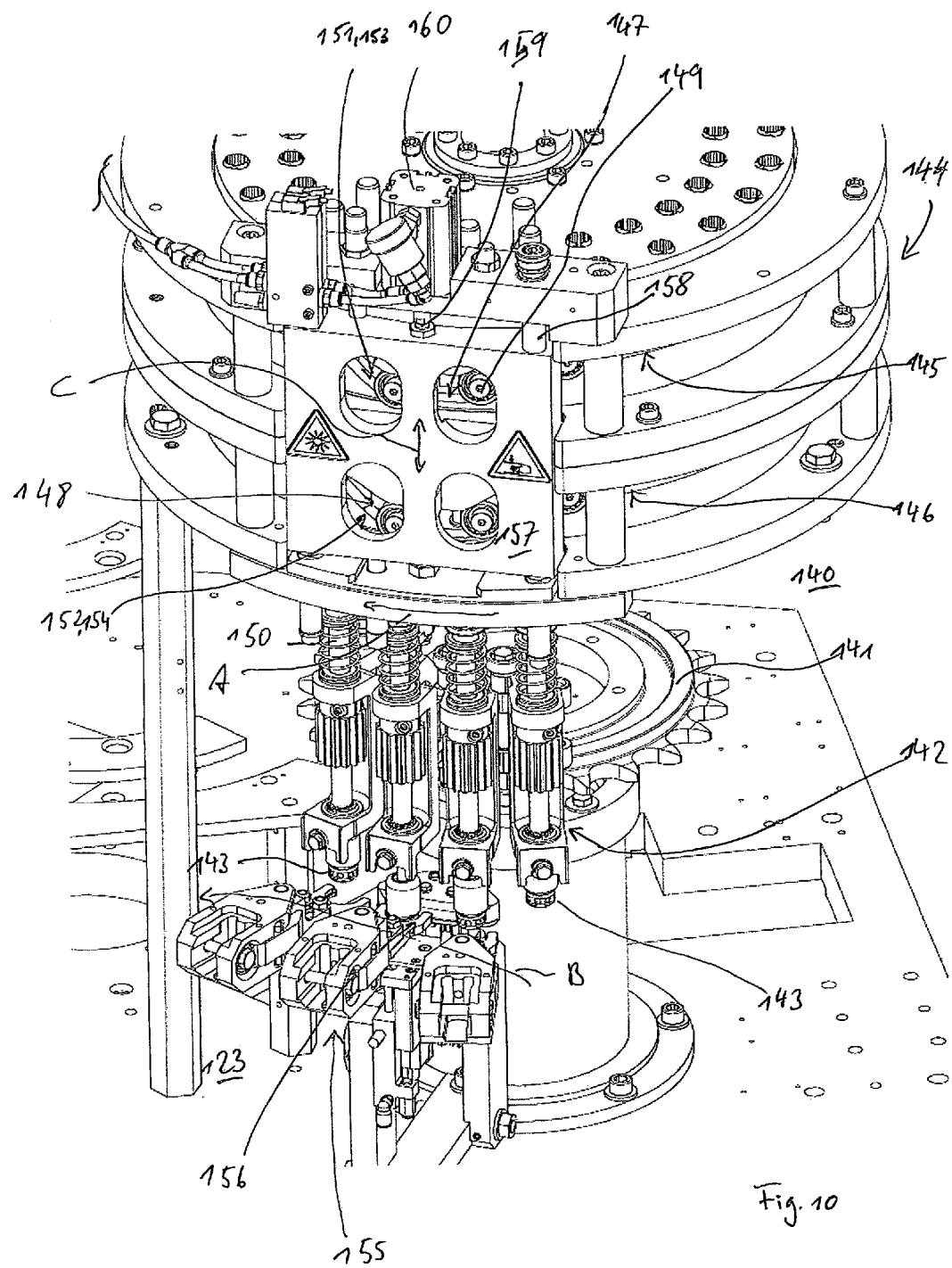
FIG. 10 shows a representation regarding FIG. 9 without preforms.
Figure 11:
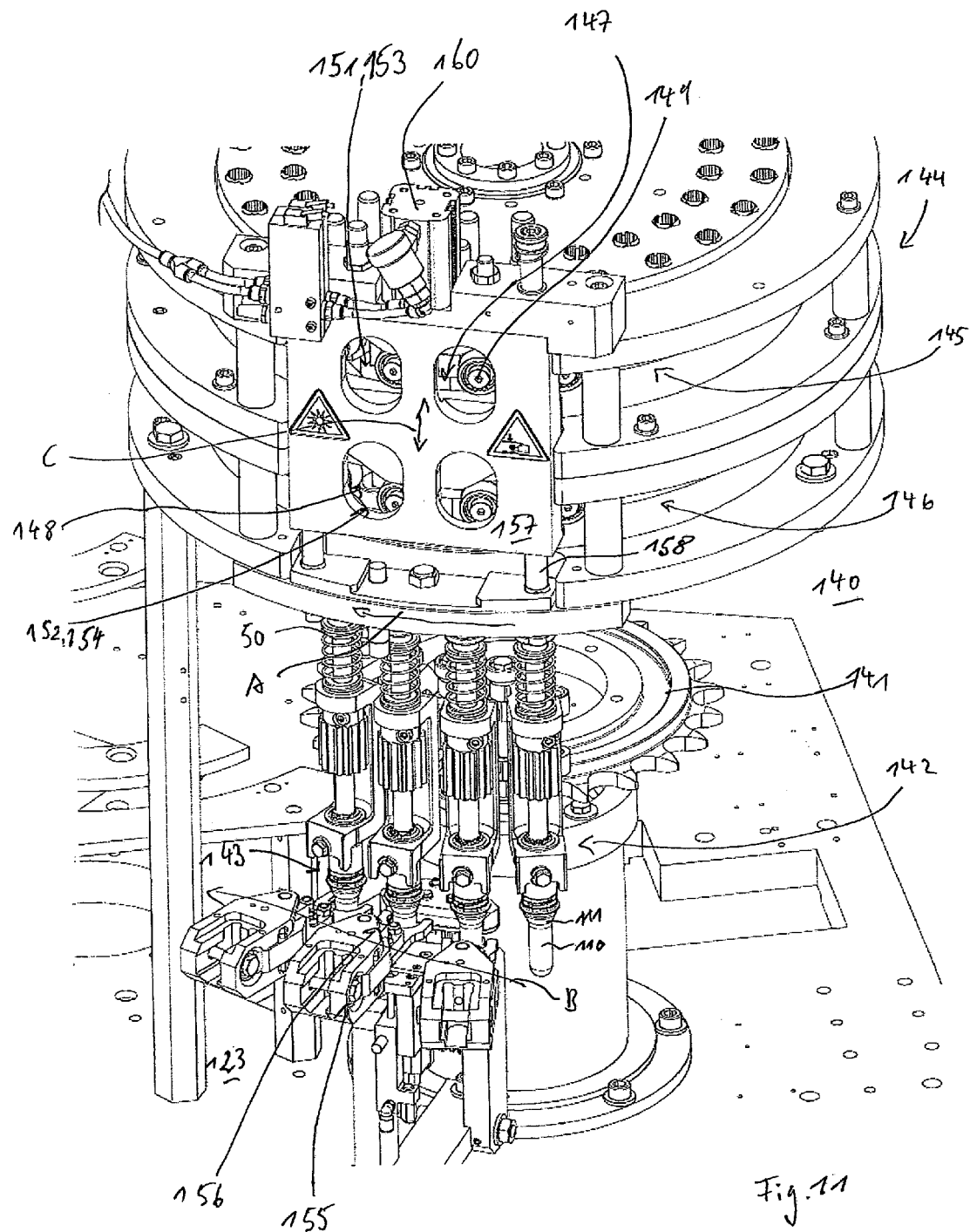
FIG. 11 shows a spatial representation of a transfer section of a heating device in engagement with a transfer device indicated by its tools, the tools of which are not in engagement with the tools of the heating device.
Figure 12:
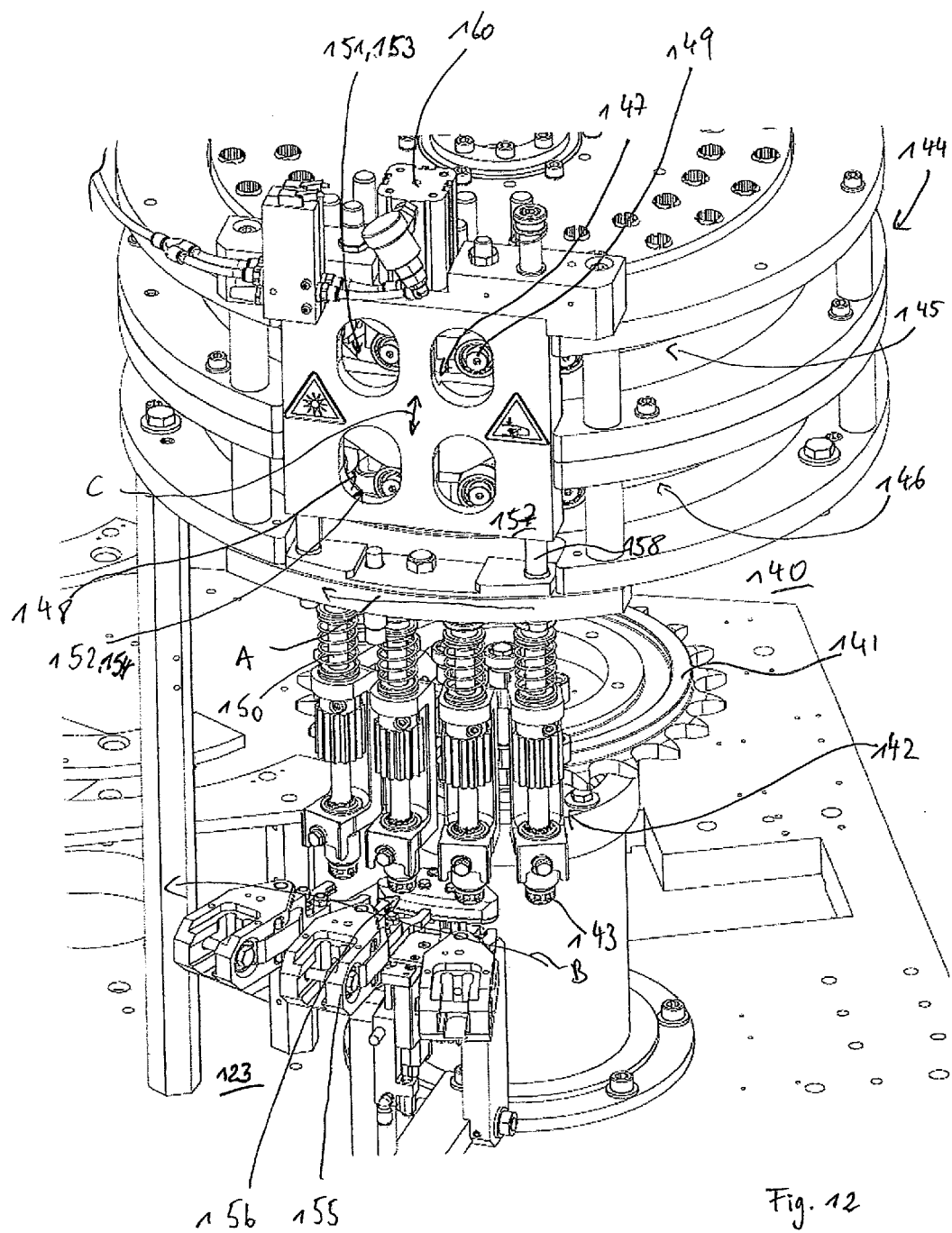
FIG. 12 shows a representation regarding FIG. 11 without preforms.

For moving the cam sections 151, 152, these are mechanically connected to one another via a plate 157, which vertically guided with guide rods 156 is arranged on these moveable in movement direction C. Furthermore, a drive 160 is provided, which via a connection 159 is connected to the plate 155. In FIGS. 9 and 10, the plate 157 is shown in the operating situation, in which the tools 142 are located in the engagement region 156. In FIG. 11 and FIG. 12, the plate 157 is shown in the fault situation for example in the case of a loss of synchronicity, in the case of which the tools 142 are located outside the engagement region 156.

The vertical stroke of the cam sections 151, 152 of the cams 147, 148 of the cam control 145, 146 causes the mandrels 142 to remain at the transport level of the heating device 102 and the tips of the mandrels 142, on which the clamping mechanisms 143 are located, are thus not lowered into the engagement region 156, by way of which a contact with the grippers 155 is excluded. As is shown here in FIG. 11, the preforms 110 located on the mandrels 142 in this embodiment are still located in the engagement region 156. In the case of the loss of synchronization, there would still be the possibility here that the grippers 155 and preforms 110 touch. In this case, the preforms 110 could if appropriate be knocked off from the clamping mechanism 143, but no damage of the grippers 155/mandrels 142 would occur.

| List of reference characters | |
|---|---|
| 1 | Blowing wheel |
| 2 | Heating device |
| 3 | Blowing station |
| 4 | Mold carrier |
| 5 | Mold carrier |
| 6 | Support arm |
| 7 | Support arm |
| 8 | Mold half |
| 9 | Mold half |
| 10 | Basic pivot bearing |
| 11 | Basic pivot bearing |
| 12 | Pivot bearing |
| 13 | Pivot bearing |
| 14 | Blowing wheel axis |
| 15 | Bearing distance |
| 16 | Heating element |
| 17 | Reflector |
| 18 | Transport chain |
| 19 | Support device |
| 20 | Transport rail |
| 21 | Turning device |
| 22 | Input wheel |
| 23 | Input wheel |
| 24 | Input wheel |
| 25 | Transfer wheel |
| 26 | Removing wheel |
| 27 | Output wheel |
| 28 | Container |
| 29 | Output route |
| 30 | Bearing housing |
| 31 | Carrier |
| 32 | Gripper |
| 33 | Control cam |
| 34 | Control cam |
| 35 | Circumference |
| 36 | Transfer region |
| 37 | Holding element |
| 38 | Base |
| 39 | Pivot joint |
| 40 | Transfer section |
| 41 | Axis of rotation |
| 42 | Positioning lever |
| 43 | Cam rollers |
| 44 | Direction of rotation |
| 45 | Longitudinal axis |
| 46 | Base pivot axis |
| 47 | Receiving trough |
| 48 | Transfer station |
| 49 | Transfer region |
| 50 | Transfer wheel |
| 51 | Servo-motor |
| 52 | Bearing housing |
| 53 | Driveshaft |
| 54 | Carrier |
| 55 | Receiving elements |
| 56 | Container |
| 57 | Basic carrier |
| 59 | Receiving element |
| 60 | Synchronous operation safeguard |
| 61 | Control element |
| 62 | Control element |
| 64 | Basic carrier |
| 65 | Recess |
| 66 | Pin |
| 67 | Tooth |
| 68 | Gap |
| 101 | Blowing wheel |
| 102 | Heating device |
| 103 | Blowing station |
| 104 | Mold carrier |
| 105 | Mold carrier |
| 108 | Mold half |
| 109 | Mold half |
| 110 | Preform |
| 111 | Mouth region |
| 112 | Pivot bearing |
| 113 | Pivot bearing |
| 114 | Blowing wheel axis |
| 116 | Heating element |
| 117 | Reflector |
| 118 | Transport chain |
| 120 | Feeding device |
| 123 | Transfer wheel |
| 126 | Removing wheel |
| 127 | Output wheel |
| 128 | Servo-motor |
| 129 | Output route |
| 130 | Bearing housing |
| 131 | Carrier |
| 132 | Gripper |
| 133 | Control cam |
| 134 | Control cam |
| 135 | Roller |
| 140 | Transfer section |
| 141 | Guide wheel |
| 142 | Support device/tool/mandrel |
| 143 | Clamping mechanism |
| 144 | Control wheel |
| 145 | Cam control |
| 146 | Cam control |
| 147 | Cam |
| 148 | Cam |
| 149 | Roller |
| 150 | Spring |
| 151 | Cam section |
| 152 | Cam section |
| 153 | Arc |
| 154 | Arc |
| 155 | Tool/gripper |
| 156 | Engagement region |
| 157 | Plate |
| 158 | Guide rod |
| 159 | Connection |
| 160 | Drive |
| A | Transport direction mandrels |
| B | Movement direction grippers |
| C | Movement direction plate |

The invention claimed is:

1. A synchronous operation safeguard for transfer stations for devices for handling containers, comprising: a first and a second rotary element, each rotary element being provided with receiving elements for the containers and in each case comprises a motor drive, wherein the rotary elements are arranged relative to one another so that the containers in a transfer region can be transferred from one of the receiving elements of the first rotary element to one of the receiving elements of the second rotary element, wherein the rotary elements in each case rotationally connected comprise a control element with engagement elements, wherein the control elements are in meshing engagement with one another, wherein the control elements are arranged so that during operation during rotary movement of the rotary elements the rotary elements are in engagement without contact and in that they are in engagement with contact in the event of a fault.

2. The synchronous operation safeguard as claimed in claim 1, wherein the engagement elements are teeth, pins, protrusions or depressions.

3. The synchronous operation safeguard as claimed in claim 1, wherein the control element is a gear wheel and/or a pin wheel.

4. The synchronous operation safeguard as claimed in claim 1, wherein the engagement elements are arranged to have a gap therebetween during operation, wherein the gap is provided so that the receiving elements are without contact in the event of a fault.

5. A device for blow-molding containers made of a thermoplastic material, comprising: at least two treatment stations with tools for receiving and holding preforms; at least one transfer device for transfer of the preforms from one of the treatment stations to a further one of the treatment stations with tools, which are designed for removing the preforms from the treatment station, for the transport of the preforms to the further treatment station and for passing the preforms on to the further treatment station, wherein at least one of the treatment stations and/or the at least one transfer device comprise at least one mechanical control device for defining movement of the tools, wherein the tools in their movement relative to one another have an engagement region and are arranged relative to one another so that movement of the tools during normal operation takes place without contact; and individual drives for driving the treatment stations and/or the transfer device, the individual drives being synchronized in terms of control, wherein the tools of at least one of the treatment stations and/or of the transfer device are movable out of the engagement region in event of a fault through a movement of at least one section of the control device.

6. The device as claimed in claim 5, wherein the treatment stations include a heating device for heating the preforms and a blowing device for forming containers from the preforms.

7. The device as claimed in claim 5, wherein the mechanical control device is a cam control.

8. The device as claimed in claim 7, wherein a section of the cam control is moveable corresponding to the engagement region, wherein the movement is a vertical movement.

9. The device as claimed in claim 7, wherein the control device includes a drive for moving the earn control.

10. The device as claimed in claim 9, wherein the drive includes pneumatic cylinders.

11. The device as claimed in claim 5, wherein the tools are mandrels or grippers.

12. The device as claimed in claim 7, wherein multiple cam sections are provided, movement of the cam sections being mechanically coupled to one another.

13. The device as claimed in claim 5, wherein the treatment stations are a heating device, a blowing device, a sterilization device, a cooling device, an additional heating device, cleaning device, labeling device, and/or filling device.

14. The device as claimed in claim 5, further comprising a synchronous operation safeguard for transfer stations for devices for handling containers, comprising: a first and a second rotary element, each rotary element being provided with receiving elements for the containers and in each case comprises a motor drive, wherein the rotary elements are arranged relative to one another so that the containers in a transfer region can be transferred from one of the receiving elements of the first rotary element to one of the receiving elements of the second rotary element, wherein the rotary elements in each case rotationally connected comprise a control element with engagement elements, wherein the control elements are in meshing engagement with one another, wherein the control elements are arranged so that during operation during rotary movement of the rotary elements the rotary elements are in engagement without contact and in that they are in engagement with contact in the event of a fault.

15. A method for securing tools for receiving and for transporting preforms or containers made of a thermoplastic material in devices for blow-molding with at least two treatment stations, and with at least one transfer device for transferring the preforms from a treatment station to a further treatment station with tools, with which the preforms are removed from the treatment station, are transported to a further treatment station and transferred to the further treatment station, the method comprising the steps of: moving the treatment stations and/or or the transfer device with individual drives that are synchronized in terms of control, wherein the tools in their movement relative to one another have an engagement region; arranging the tools relative to one another so that the movement of the tools takes place without contact during a normal operation; and controlling movement of the tools by a mechanical control so that the tools of at least one of the treatment stations and/or of the transfer device are moved in event of a fault out of the engagement region in by a movement of at least one section of the control device.

16. The method as claimed in claim 15, wherein the mechanical control is a cam control, wherein a section of the cam control is moved corresponding to the engagement region.

17. The method as claimed in claim 16, wherein the movement is a vertical movement.

* * * * *